United States Patent [19]
Hayata et al.

[11] Patent Number: 5,713,023
[45] Date of Patent: Jan. 27, 1998

[54] DATA MANAGEMENT DEVICE PROVIDING INCREASED STORAGE AND RECORD ACCESS EFFICIENCY OF CLUSTERED DATA

[75] Inventors: Hiroshi Hayata; Yoshiki Watanabe, both of Kanagawa, Japan

[73] Assignee: Fuji Xerox Co., Ltd., Tokyo, Japan

[21] Appl. No.: 507,922

[22] Filed: Jul. 27, 1995

[30] Foreign Application Priority Data

Jul. 30, 1994 [JP] Japan ................................. 6-198031

[51] Int. Cl.$^6$ ........................................................ G06F 17/30
[52] U.S. Cl. .......................... 395/616; 395/621; 395/441
[58] Field of Search ................................. 395/601, 610, 395/614, 616, 617, 445, 474, 725, 497.01, 497.04, 441

[56] References Cited

U.S. PATENT DOCUMENTS 5,421,015  5/1995  Khoyi et al. ............................. 395/677
5,448,727  9/1995  Annevelink ............................. 395/612

FOREIGN PATENT DOCUMENTS 2-222044  9/1990  Japan .
3-288944  12/1991  Japan .

OTHER PUBLICATIONS

Q. Li et al., "A Conceptual Model for Dynamic Clustering in Object Databases", Proceedings of the 18th VLDB Conference, pp. 457–468 (1992).

"ObjectStore User Guide", Object Design, Inc., pp. 63–69 (1992).

*Primary Examiner*—Paul V. Kulik
*Attorney, Agent, or Firm*—Finnegan, Henderson, Farabow, Garrett & Dunner, L.L.P.

[57] ABSTRACT

Each of clusters manages records. A plurality of record operation processing units execute operations on the records. When a particular one of the clusters receives a record operating command, a record operating mechanism selection unit selects, based on a record operating mechanism selecting command, one of the record operation processing units to which the record operating command should be supplied from the particular cluster.

8 Claims, 10 Drawing Sheets

FIG. 3
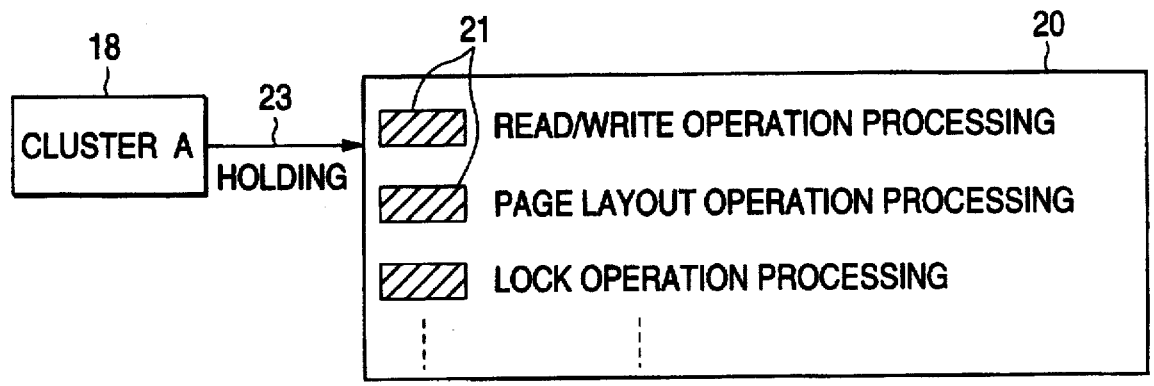
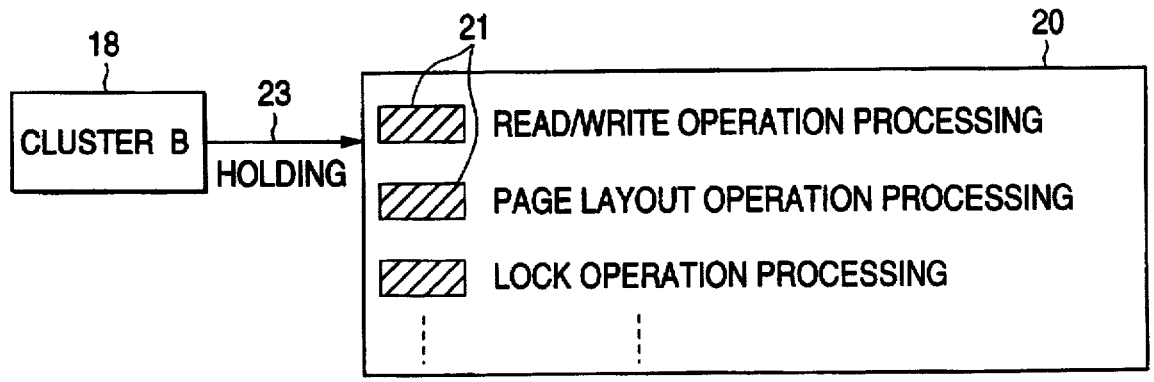

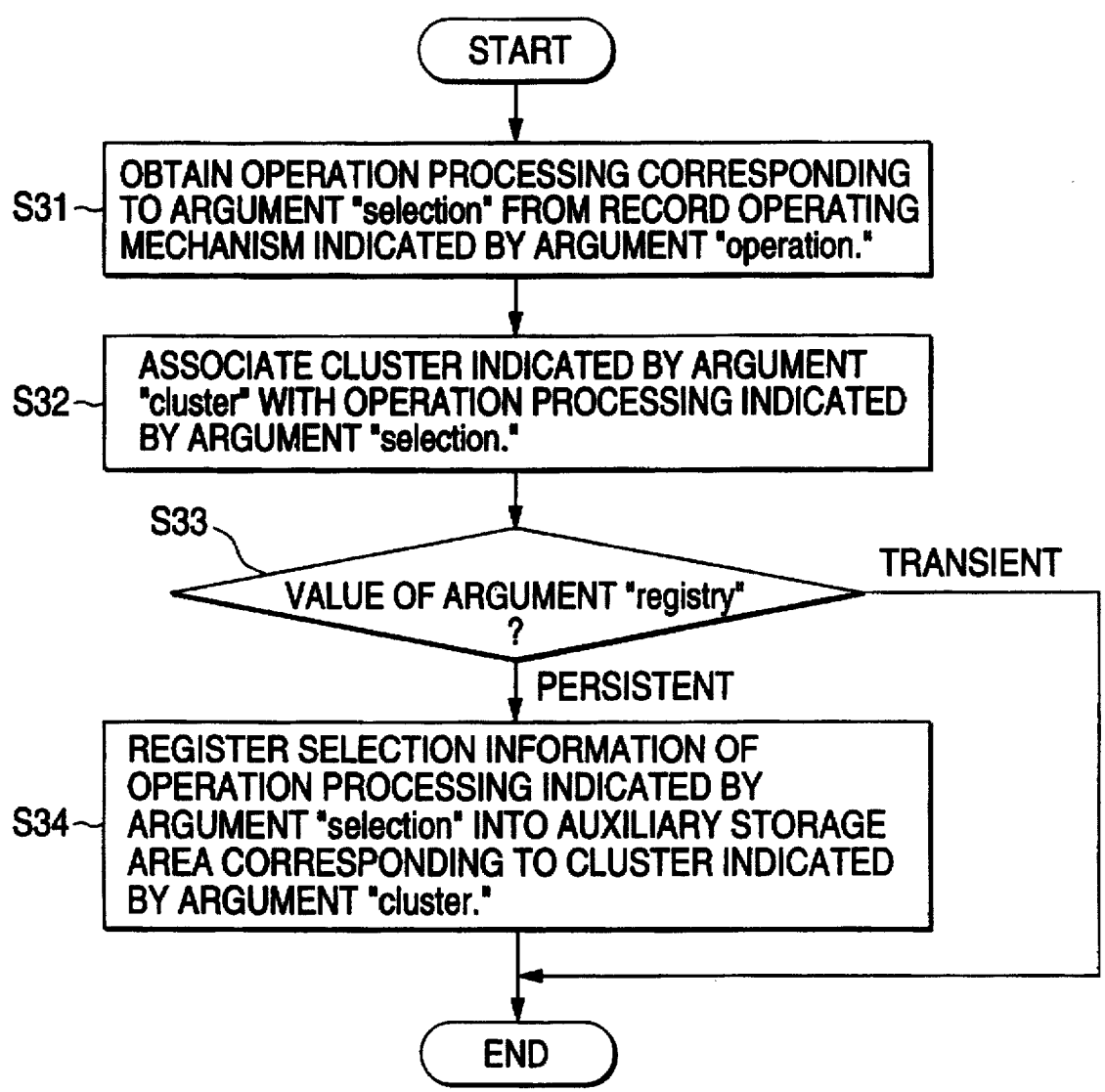

DATA MANAGEMENT DEVICE PROVIDING INCREASED STORAGE AND RECORD ACCESS EFFICIENCY OF CLUSTERED DATA

BACKGROUND OF THE INVENTION

1. Field of the Invention

The present invention relates to a data management device, and particularly to a data management device for controlling various operations on records managed by clusters in accordance with various environments where each cluster is used in clustering control of a data base system.

2. Description of the Related Art

A clustering technique has been generally utilized to manage data in a data base system. As described in "Information Processing Handbook (first edition)" (Nov. 20, 1993) edited by Information Processing Society of Japan, issued by Ohmsha, pp. 651, the clustering is defined as a data processing manner in which mutually-related records are stored while being collected into the same page or physically-adjacent pages as much as possible in order to improve a storage efficiency of records or an access efficiency to the records for reference or renewal which will be performed to the records in the future. Here, the "record" is defined as a unit of information.

In this clustering technique, clusters are used to manage the records, and each cluster comprises a single page or a group of continuous plural pages. If the records are managed by proper clusters, the frequency of data operations on an auxiliary storage device when the records are required to be referred to or renewed could be reduced.

Both the record storage efficiency and the record access efficiency vary in accordance with variation of the access frequency to plural records to be managed by the clusters or variation of the number of the records. In these cases, in order to keep the record storage efficiency or the record access efficiency to be high, it has been hitherto adopted that clusters or those data which are stored in a database file holding the clusters are timely reorganized as disclosed in Japanese Unexamined Patent Publication No. Hei. 2-222044 (hereinafter referred to as "prior art 1") and Japanese Unexamined Patent Publication No. Hei. 3-288944 (hereinafter referred to as "prior art 2").

The prior art 1 discloses a data processing device in which a re-storage processing for a clustered structural database is performed at high speed. In this data processing device, a structural data base is subjected to clustering for data management (in the prior art 1, the "clustering" means that records are arranged so that a parent-child relationship is satisfied between the records, and child records are disposed near to parent records), and for the structural data base thus clustered, a record re-storage processing is conducted to simulate a reference order of existing records and perform the re-storage of the records, whereby the frequency of a write-in operation (I/O frequency) can be greatly reduced and clusters can be reorganized at high speed.

The prior art 2 discloses a technique for reorganizing (rearranging) a database during use of the database. In this database reorganizing technique, the reorganization (rearrangement) is performed for every small range of data segments (each of which is substantially identical to a cluster) required to be organized, so that the data base can be reorganized without interrupting work-flow.

However, the reorganizing methods as disclosed in the prior art 1 and 2 in which data are timely reorganized to maintain a high record storage efficiency and record access efficiency, have the following two problems. The first problem is that it takes a long time to perform the data reorganization itself and the cost is high. The second problem is that it is impossible to perform the reorganization in accordance with various environments where an individual cluster is used.

SUMMARY OF THE INVENTION

An object of the present invention is to provide a data management device which can adjust to each of various environments where a cluster is used in a short time without altering the organization (arrangement) of data, and can maintain a high record storage efficiency and record access efficiency.

In order to achieve the above object, according to the present invention, a data management device for managing data stored in a storage device (auxiliary storage device 14) includes plural clusters (18) for managing records (19) which are subjected to clustering, plural record processing means (record operation processing units 21, 121a to 121c, 221a to 221c) for processing various operations on the records (19), -and selection means (record operating mechanism selection units 22, 122) for selecting from the plural record processing means an output target to which a record operating command (D2) supplied to the clusters (18) is output.

According to the data management device of the present invention, when a record operating command on records is supplied to a cluster for managing an assembly of records which have been subjected to clustering (hereinafter referred to as "clustered records"), on the basis of a selecting operation of selection means, the cluster outputs the record operating command to a record processing means which is held by the cluster itself. Upon reception of the record operating command, on the basis of a record and an operation content which are indicated by the record operation command, the record processing means executes the indicated operation on the indicated record. The holding relationship between a cluster and a record processing means, that is, which record processing means should be held by which cluster is determined through the selection of the selection means. The "holding relationship" means the relationship that when a cluster receives a record operating command on records, the cluster transmits the record operating command to the corresponding record processing means in order to execute some operation on the records on the basis of the record operating command.

In the data management device of the present invention, plural record processing means are provided separately from the clusters while being grouped to meet various potential environments where each of plural clusters is used. For example, the record processing means may be divided into plural groups, one of which is suitably used to operate records having short data size, another group of which is suitably used to operate records having long data size, etc. Each of the plural record processing means is held by each cluster in accordance with an environment where the cluster is used. As described above, which record processing means should be held by which cluster, is actually determined on the basis of a selection operating command of the selection means. In other words, the holding relationship between the cluster and the record processing means as described above is established by the selection means.

The holding relationship with which the cluster holds the record processing means is timely altered by the selection means upon variation of the environment where the cluster is used. For example, as the number of records stored in a cluster varies, the holding relationship before the variation is switched to another holding relationship to select a record processing means in accordance with the new number of records.

As described above, for example in a database system, the optimum record processing means can be individually and automatically selected for a cluster in accordance with various environments the cluster is used without altering the organization (arrangement) of data, so that the frequency of the data operation on the storage device can be reduced and thus the record storage efficiency and the record access efficiency can be improved.

The following two modes may be used to establish the holding relationship between the cluster and the record processing means.

In the first mode, the plural record processing means are classified into plural groups on the basis of the size of data, use or non-use of a cache, the size of data scale, etc. so that each group contains plural record processing means having different types of operations on records, such as a read/write operation, a page layout operation, a lock operation, etc. In this case, clusters are designed so that each cluster holds each record processing means on a group basis (i.e., every group containing plural record processing means). Accordingly, when the holding relationship is switched, the record processing means are altered on a group basis (every group containing plural record processing means).

In the second mode, the plural record processing means are classified into plural groups on the basis of the record operation type so that each group contains physical page unit record processing means, logical page unit record processing means, cluster unit record processing means, etc. In this case, the clusters are designed so that each cluster holds, as a unit, one record processing means in each of the plural groups. Accordingly, when the holding relationship is switched, a record processing means in each group is switched to another record processing means in the group independently of another group.

The two modes on the holding of the record processing means by the clusters constitute a part of the constitution of the present invention.

BRIEF DESCRIPTION OF THE DRAWINGS

FIG. 3 schematically illustrates an example in which a cluster individually holds a record operating mechanism;

FIG. 10 is a flowchart showing processing relating to a record operating mechanism selecting operation command ("sel") in a record operating mechanism selection unit of the second embodiment.

DETAILED DESCRIPTION OF THE PREFERRED EMBODIMENTS

Preferred embodiments of the present invention will be described hereunder with reference to the accompanying drawings.

Figure 1:
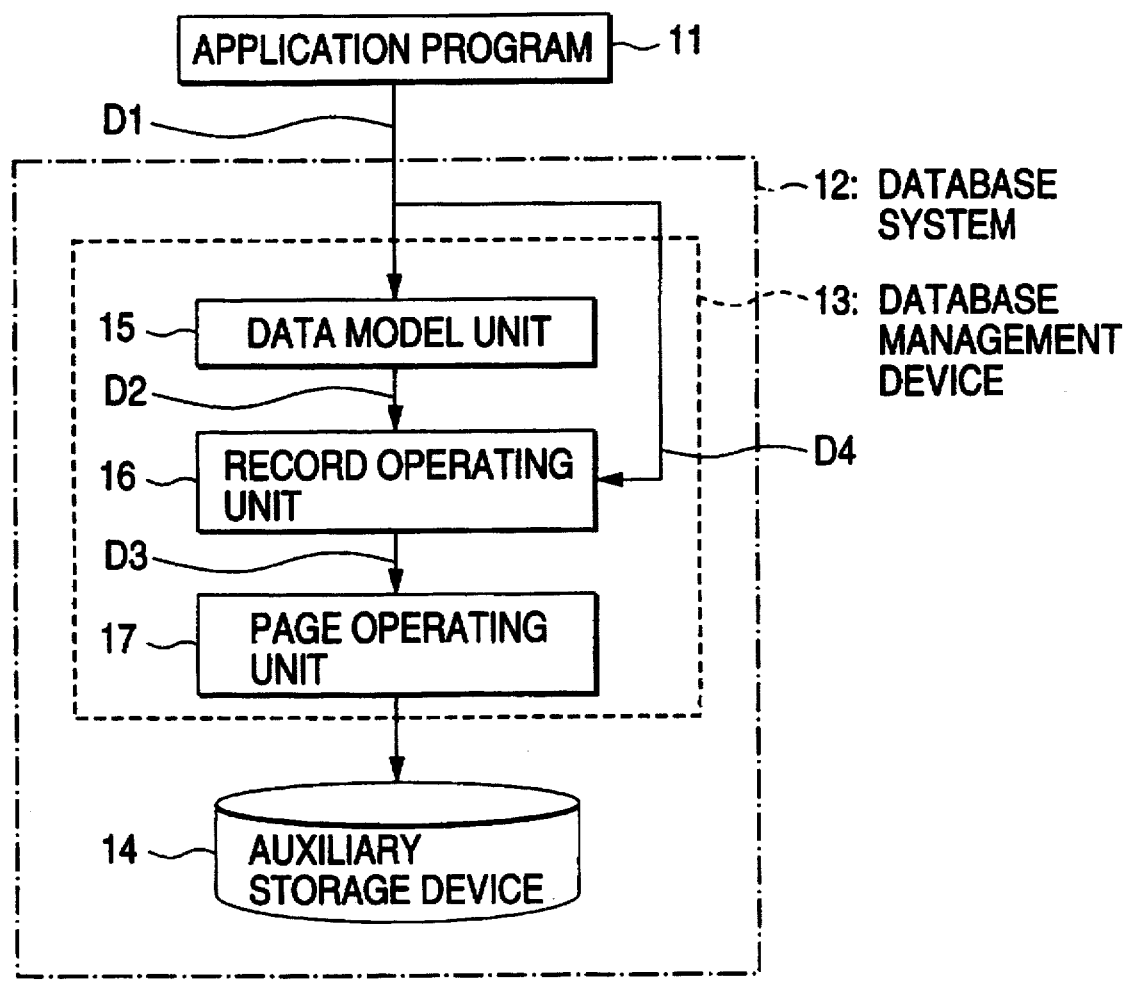
FIG. 1 is a block diagram showing an embodiment of a data management device according to the present invention.

FIG. 1 is a block diagram showing an embodiment of a data management device according to the present invention. The data management device of this embodiment corresponds to a data base management system of a database system, for example. In the data management device as shown in FIG. 1, a database operating command D1 is supplied from an application program 11 serving as a user to a data base system 12. The application program 11 is a program for managing the database management system. For example when drawings for CAD are stored into a database, through the database operating command D1 the application program indicates a procedure as to how to store the drawings for the CAD into the database or how to operate the stored drawings. The database operating command D1 corresponds to a processing demand using a data operating language.

In the database system 12 shown in FIG. 1, only a data management device 13 and an auxiliary storage device 14 are illustrated to simplify the description, and other constructing elements such as an OS (operating system), a schema, a buffer for delivering actual data, etc. are omitted from the illustration. A large amount of data are stored every record in the auxiliary storage device 14. The data management device 13 receives the database operating command D1 from the application program 11 to operate actual data stored in the auxiliary storage device 14 through a data management function of the OS while referring to a schema or a sub-schema.

The data management device 13 includes a data model unit 15, a record operating unit 16 and a page operating unit 17.

The data model unit 15 has a function of establishing a model for a database. In order to faithfully reflect a real-life aspect in information stored in the database, some abstraction must be performed on the information to grasp an object. In view of the modeling for the abstraction in the real word, for example, an object-oriented model is introduced by the data model unit 15. The object-oriented model is defined as a model which is designed such that an object contains data and the content of processing to be conducted on that data. In addition to the object-oriented model, a relational model may be provided as another data model. In the relational model, the data are represented with a two-dimensional table comprising columns and rows, and they are searched through an operation on the table.

The data model unit 15 has the model establishing function as described above, and it also serves to convert the database operating command D1 supplied from the application program 11 into a record operating command D2. When a model established in the data model unit 15 is an object-oriented model, the database operating command D1 is an operation which is described in an object-oriented language supplied by the object-oriented model. On the other hand, when a model established in the data model unit 15 is a relational model, the database operating command D1 is an operation which is described in an operation language SQL (structured query language) supplied by the relational model.

The database operating command D1 indicates various data operations such as a data generating operation, a data deleting operation, a data read/write operation, etc. which are performed on a record-by-record basis on actual data which are stored in the auxiliary storage device 1. The data stored in the auxiliary storage device 1 are operated every record (that is, an operation unit of the data in the auxiliary storage device 1 is a record), and thus the database operating command D1 is converted to a record operating command D2 for which a record is used as an operating unit.

Each record is byte data, and it has a structure which is independent of the data model. For example, one object in the object-oriented model is represented in correspondence to one record. Specifically, the record operating command D2 also indicates various operations such as generating operation and deleting operations for an individual record, a read/write operation of a part or the entire of an individual record, lock and unlock operations for an individual record, etc. According to the object-oriented model as described above, the generation of an object corresponds to generation of a record, and the read-out of an object corresponds to read-out of a record. The data model unit 15 performs the processing for these operations, that is, as to whether a record should be generated, where a record should be stored, how read-out data should be interpreted, etc. are performed in the data model unit 15.

The record operating unit 16 performs various operations on every record. The types of the record operations are as follows: a record generating operation, a record deleting operation, a read/write operation of a part or the entire of a record, a record lock operation, a record unlock operation, etc. The record operating unit 16 has a clustering control function. In the record operating unit 16, plural clusters are prepared and each cluster manages an assembly of records which are assembled through clustering. Furthermore, in the record operating unit 16, the record operating command D2 which is supplied from the data model unit 15 is converted to a page operating command D3, and the page operating command D3 thus formed is output to the page operating unit 17.

The page operating unit 17 has a function of performing various operations on a page-by-page basis, and it performs read-out and write-in operations every page between a main storage device (not shown) and the auxiliary storage device 14.

The record operating unit 16 is also supplied with a record operating mechanism selecting command D4 from the application program 11. The record operating mechanism selecting command D4 may be supplied from the data model unit 15.

Figure 2:
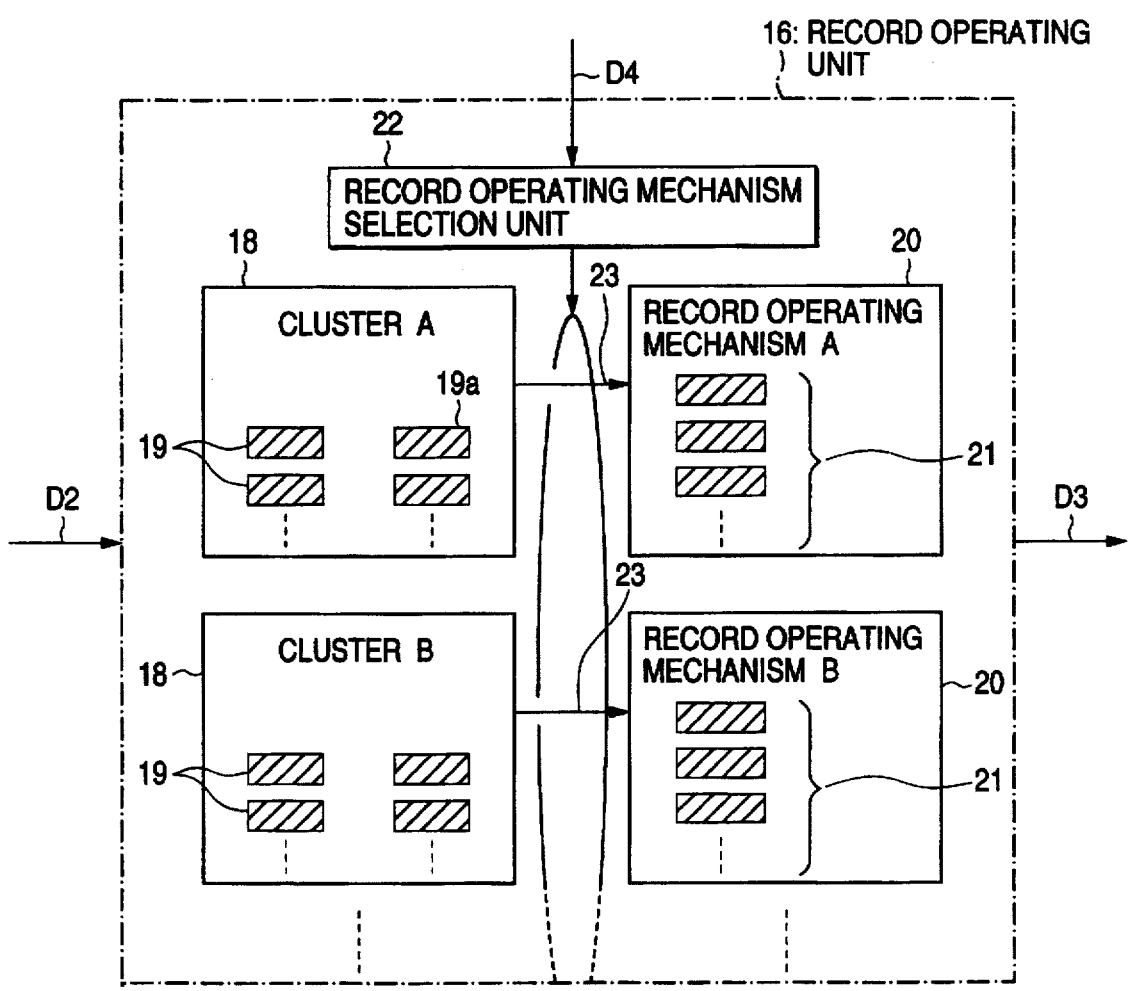
FIG. 2 is a block diagram showing a first embodiment of a record operating unit.

FIG. 2 is a block diagram showing a first embodiment of the record operating unit 16 as shown in FIG. 1. The record operating unit 16 of this embodiment includes plural clusters 18, plural record operating mechanisms 20 and a record operating mechanism selection unit 22 as shown in FIG. 2.

Each of the plural clusters 18 serves to manage plural records 19 which are associated with one another and assembled on the basis of clustering control. A record stock state in which plural records 19 are stocked in a cluster 18 as shown in FIG. 2 means that these plural records 19 are managed by the cluster 18 in which the records 19 are stocked. A description will be made of an example of the record management by the cluster. For example, when a record is generated by indicating cluster, the cluster judges where the record should be stored properly, thereby determining a storage place in the auxiliary storage device 14 at which the record is to be stored. Furthermore, when a record read-out operation is carried out, the cluster judges how to read for an efficient operation on a target record and other records associated with the target record (hereinafter all of these records containing the target record are referred to as "related records"), thereby determining an operation content.

Through the clustering control, the plural related records 19 are stored into the same page or physically-adjacent pages as much as possible, whereby the record storage efficiency can be improved and the record access efficiency for record reference or record renewal which will be performed in the future can be also improved.

Each of the plural record operating mechanisms 20 includes plural record operation processing units 21 for performing various operations on the records 19 which are managed by each cluster, and each record operating processing unit 21 has a function of performing an operation (processing) on records each record operation processing unit 21 is constructed by a program which defines the procedure of each processing. The record operation (the operation to be performed on records) which is executed in each of the plural record operation processing units 21 contains a read/write operation, a page layout operation, a lock operation, etc., for example. In the following description, in order to make discrimination between the clusters and between the record operating mechanisms, each of the plural clusters 18 is referred to as "cluster A," "cluster B" or the like in accordance with its content if occasion demands, and also each of the plural record operating mechanisms 20 is referred to as "record operating mechanism A," "record operating mechanism B" or the like in accordance with its content if occasion demands.

As shown in FIG. 3, each cluster is related to one record operating mechanism 20 as indicated by an arrow 23 (in other words, each cluster holds one record operating mechanism 20). That is, the following relationship is established between each cluster and each record operating mechanism 20. Upon input of a record operating command D2 to a cluster 18, the record operating command is outputted from the cluster 18 to one record operating mechanism which is related to the cluster as indicated by an arrow 23. The relationship between the cluster 18 and the record operating mechanism 20 is referred to as "holding relationship." In other words, the arrow 23 directing from the cluster 18 to the record operating mechanism 20 indicates a relationship that a cluster holds a record operating mechanism 20. The holding relationship indicated by the arrow 23 is specifically established by securing a storage area for setting a pointer in the cluster 18 and setting a pointer to a specific record operating mechanism in the storage area. The record operating mechanism selection unit 22 selects any one of the record operating mechanisms 20 on the basis of the record operating mechanism selecting command D4 to establish the holding relationship (arrow 23) directing from the cluster 18 to the record operating mechanism 20.

The record operating mechanism selecting command D4 is accessed at a suitable timing of the application program 11 or the like. For example, in a case where a record group which is managed by a cluster is operated (a case where the access frequency varies), the record operating mechanism selecting command D4 is accessed if the application program 11 judges that it is efficient to operate the record group with a specific record operating mechanism.

The record operating unit 16 is supplied with the record operating command D2 from the data model unit 15 as described above. The record operating command D2 is a processing command to be supplied to the corresponding record, and it contains an identifier for specifying the record to be processed (target record). Furthermore, the record operating mechanism selecting command D4 is supplied to the record operating mechanism selection unit 22 as described above, and the record operating mechanism selection unit 22 sets the holding relationship between the cluster 18 and the record operating mechanism 20 on the basis of the record operating mechanism selecting command D4.

An example (a holding state) that a cluster individually holds one record operating mechanism will be conceptually described with reference to FIG. 3. FIG. 3 show holding relationships between a cluster A and a record operating mechanism A and between a cluster B and a record operating mechanism B. For example, the cluster A is set as a cluster for managing records (a group of clustered records) having a short data size, and the cluster B is set as a cluster for managing records (a group of clustered records) having a long data size. The record operating mechanism A is suitable to operate the records having a short data size, and it includes record operation processing units for the read/write operation, the page layout operation, the lock operation, etc. on the auxiliary storage device 14 respectively, which are suitable for the records having a short data size. The record operating mechanism B is suitable to operate the records having a long data size, and it includes record operation processing units for the read/write operation, the page layout operation, the lock operation, etc. on the auxiliary storage device 14 respectively, which are suitable for the records having a long data size. The cluster A holds the record operating mechanism A, and the cluster B holds the record operating mechanism B.

Upon selection of the holding relationship with the record operating mechanism A, the cluster A selects the processing for the read/write operation, the lock operation, the page layout operation or the like every physical page size (for example, 1 Kbytes). When the page layout operation is selected, many records are allocated within a physical page size. On the other hand, upon selection of the holding relationship with the record operating mechanism B, the cluster B selects the processing for the read/write operation, the lock operation, the page layout operation or the like every logical page size (for example, 500 Kbytes). When the page layout operation is selected, processing for ensuring continuity of long data is performed.

The holding of the record operating mechanism A by the cluster A and the holding of the record operating mechanism B by the cluster B are established through the selecting operation of the record operating mechanism selection unit 22. Furthermore, the holding relationship between any cluster and any record operating mechanism can be switched in accordance with an environment where each cluster is used through the selecting operation of the record operating mechanism by the record operating mechanism selection unit 22.

Next, a switching operation of the holding relationship with the record operating mechanism by the cluster will be described with reference to FIGS. 4 and 5.

Figure 4:
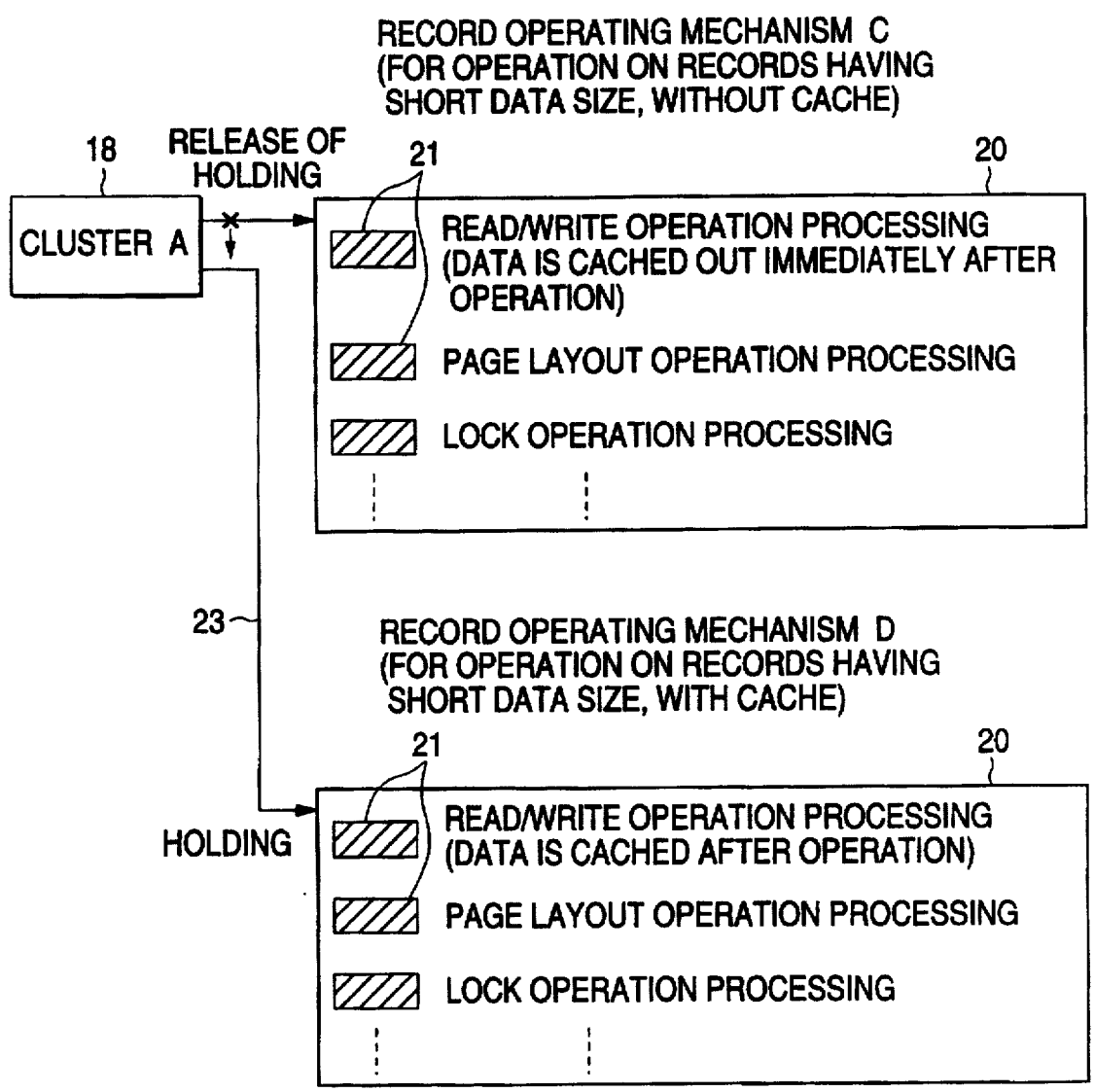
FIG. 4 illustrates an example of cluster control when the frequency of access to records of a cluster varies.

FIG. 4 shows a switching operation for the holding relationship when the frequency of access to the record 19 by the cluster A varies. It is assumed that the cluster A is first suitably used for a record group of short data size and it holds a record operating mechanism C for receiving and sending records without using a cache memory. According to this holding relationship, an operation on records using no cache memory is performed, and a single operation on the records is performed. Now, it is assumed that a continuous operation on the records are required to be performed due to variation of the access frequency to the records at a time. In this case, the holding relationship is switched to another holding relationship at that time so that the cluster A holds a record operating mechanism which is suitably used for a record group of short data size and performs record communication (reception and sending of records) using a cache memory. As described above, the record operating mechanism which is held by the cluster A is dynamically switched from the mechanism C to the mechanism D during operation of the system, whereby a high access efficiency can be obtained even when the access frequency to the records varies.

Figure 5:
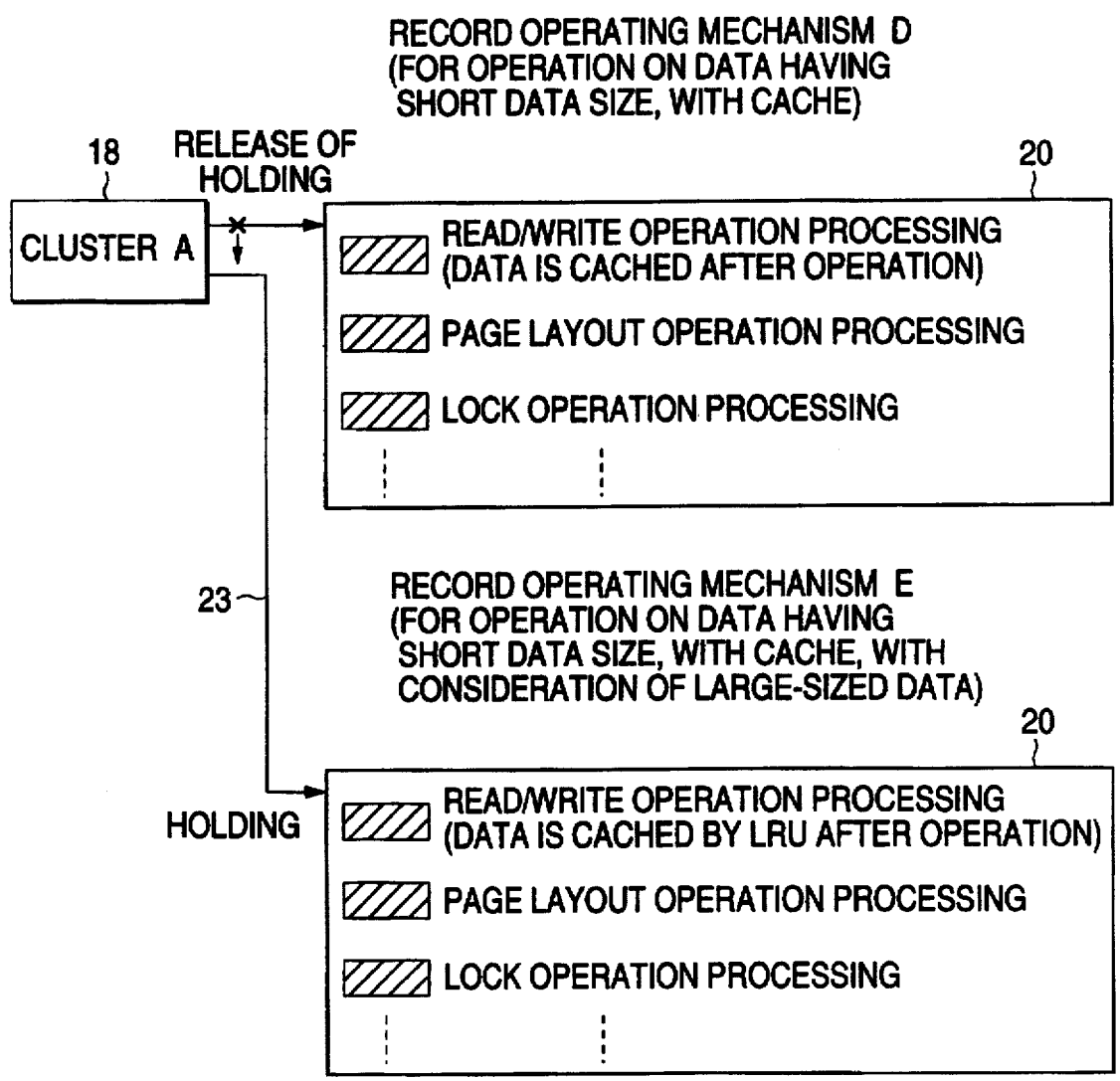
FIG. 5 illustrates an example of cluster control when the number of records of a cluster varies.

FIG. 5 shows a switching operation for the holding relationship when the number of records 19 stored in the cluster varies. It is assumed that at a first stage the cluster A is suitable for a record group of short data size and holds a record operating mechanism D for receiving and delivering records using the cache memory. According to this holding relationship, an operation on the records using the cache memory is performed, and the operation is continuously performed on the records at a high access frequency to the records. At a certain time point, the number of the records which are stored in the cluster A increases, and thus it is necessary to use not only the cache memory, but also some processing, such as a LRU (least recently used) algorithm, in which forced cache out is taken into consideration. At this time the holding relationship is switched to another holding relationship so that the cluster A holds a record operating mechanism E which is suitable for short data size and performs record communication using the cache memory and also to which the LRU algorithm is applied. As describe above, the record operating mechanism which is held by the cluster A is dynamically switched from the mechanism D to the mechanism E during the operation of the system, whereby the high access efficiency can be also obtained even when the number of the records increases.

In the embodiment as described above, the switching operation for the holding relationship with which the cluster A holds the record operating mechanism is applied to a switching from the record operating mechanism C to the record operating mechanism D, and a switching from the record operating mechanism D to the record operating mechanism E. The switching operation of this embodiment is not limited to these switching operations. But, in accordance with an environment where the records are used, the switching operations as described above may be reversed, or a switching operation to another record operating mechanism may be performed.

Figure 6:
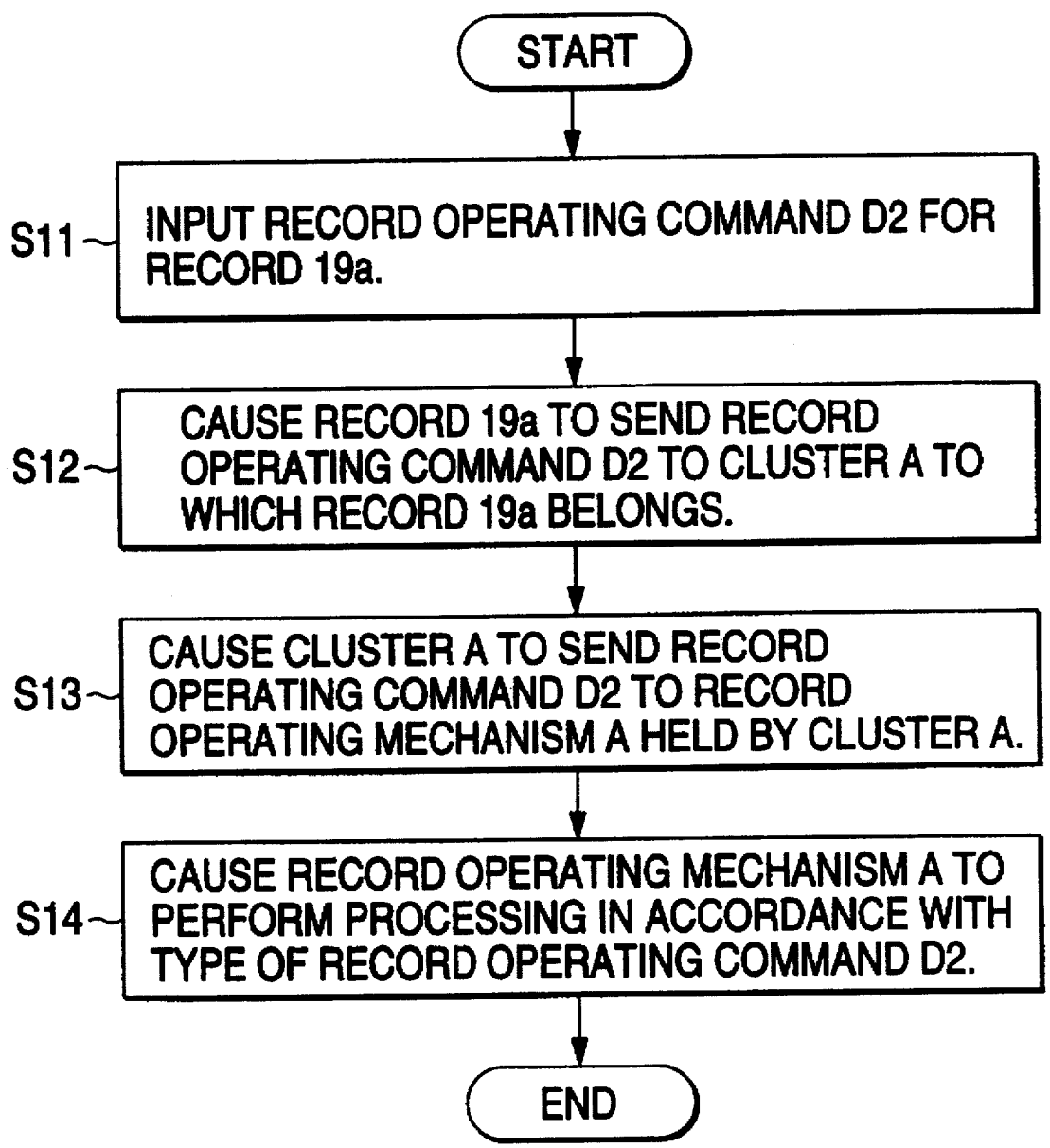
FIG. 6 is a flowchart of record operation processing.

Next, a processing flow of the record operating command D2 which is supplied from the data model unit 15 to the record operating unit 16 will be described with reference to FIG. 6. As the type of the record operating command D2 are used the following operations: "allocate," "free," "expand," "read," "write," "lock," "unlock," etc. The content of each operation on records is as follows.

allocate: secure records of indicated size on auxiliary storage device free: release record area on auxiliary storage device expand: expand record area on auxiliary storage device read: read data from record area on auxiliary storage device write: write data into record area on auxiliary storage device lock: lock record area on auxiliary storage device unlock: unlock record area on auxiliary storage device When a record operating command D2 for a record, for example, a record 19a in the cluster A (see FIG. 2) is input to the record operating unit 16 (step S11), the record 19a transmits the record operating command D2 to the cluster A to which the record 19a itself belongs (step S12), and then the cluster A transmits the record operating command D2 to the record operating mechanism (for example, the record operating mechanism A) which is held by the cluster A itself (step S13). The record operating mechanism A executes an operation in accordance with the content of the record operating command D2 (step S14). As described above, the record operating command D2 which has been supplied to the record operating unit 16 is transmitted to the cluster A to which the record 19a serving as a record operating target belongs, and the processing for operations corresponding to the content of the record operating command D2 is performed by each of the various record operating processing units 21 of the record operating mechanism A which is held by the cluster A. The record operating mechanism A operates a corresponding page in the processing.

Next, a processing flow of the record operating mechanism selecting command D4 which is supplied from the application program 11 to the record operating mechanism selecting unit 22 of the record operating unit 16 will be described with reference to FIG. 7. The record operating mechanism selecting command D4 is given as a selection command "sel": sel (cluster, selection, registry).

According to the command "sel," a cluster to be controlled is specified with argument "cluster," the type of a record operating mechanism, for example, any one of the record operating mechanisms A to E as described above is specified with argument "selection," and "transient" or "persistent" is specified with argument "registry." The "transient" means that a selection result is effective only in a selected process, and the "persistent" means that a selection result is effective as a default from this time on.

Figure 7:
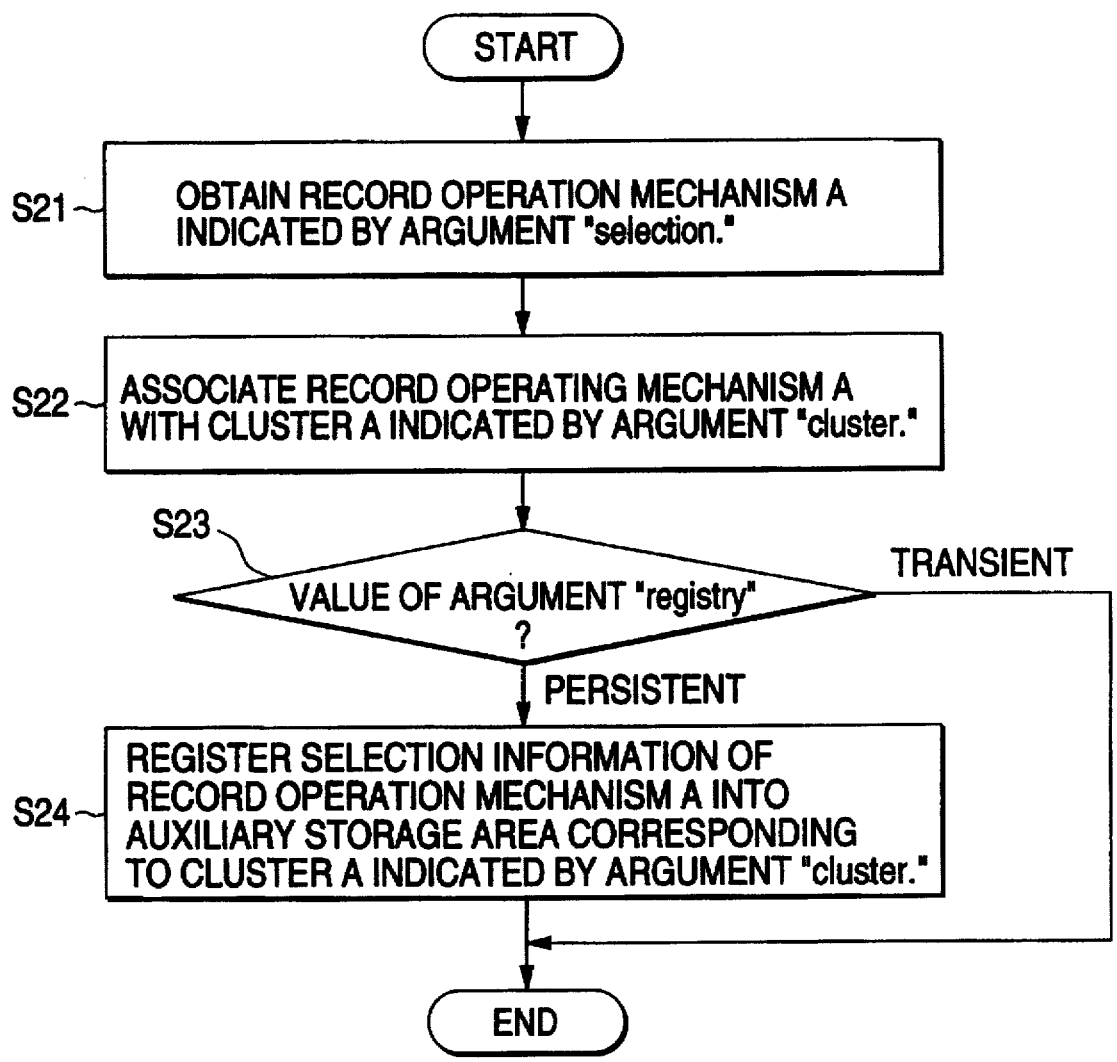
FIG. 7 is a flowchart showing processing relating to a record operating mechanism selecting operation command ("sel") in a record operating mechanism selection unit.

In FIG. 7, when the record operating mechanism selecting command D4, that is, the command "sel" is input to the record operating mechanism selecting unit 22, a record operating mechanism corresponding to the argument "selection" (for example, the record operating mechanism A) is first determined (step S21). Subsequently, the record operating mechanism A is related to a cluster which is specified with the argument "cluster" (step S22). That is, a holding relationship between the specified cluster and the record operating mechanism A is established so that the specified cluster holds the record operating mechanism A. In next step S23, it is judged whether the value of the argument "registry" indicates "transient" or "persistent." If the value of the argument "registry" indicates "transient," the processing is finished. On the other hand, if the value of the argument "registry" indicates "persistent," step S24 is executed to register selection information of the record operating mechanism A into an area of the auxiliary storage device 14 for the cluster which is specified with the argument "cluster."

As described above, with the command sel, the specified cluster can select and hold the specified record operating mechanism. Furthermore, if the argument "registry" is set to "transient," this selection result (selection of the cluster and the record operating mechanism A) is set as an individual and independent result which will have no effect on use of the same cluster in the future process. On the other hand, if the argument "registry" is set to "persistent," this selection result is set as a common result which will be automatically used in the future process.

In the first embodiment of the record operating unit 16 as described above, various types of record operating mechanisms (A, B, . . . ) each of which contains plural record operation processing units 21 are provided for plural clusters (A, B) 18 each managing plural related records 19, and a record operating mechanism which is suitable for an environment where each cluster is used is specified by the record operating mechanism selecting unit 22 to associate the cluster and the specified record operation mechanism with each other. Through this operation, the optimum processing to can be individually executed for each cluster.

Furthermore, according to the first embodiment, the holding relationship between each of the plural clusters 18 and each of the plural record operating mechanisms 20 is dynamically switched to a desirable one by the record operating mechanism selecting unit 22 so that the optimum processing can be performed, every recording operating mechanism 19 containing plural record operation processing units 21 in accordance with alteration of an environment of use such as variation of the access frequency to the records, variation of the number of records or the like. Through this switching operation, the higher access efficiency can be kept.

Next, a second embodiment of the record operating unit according to the present invention will be described with reference to FIGS. 8 to 10. In this embodiment, the internal construction of the record operating unit of the first embodiment is partially altered.

Figure 8:
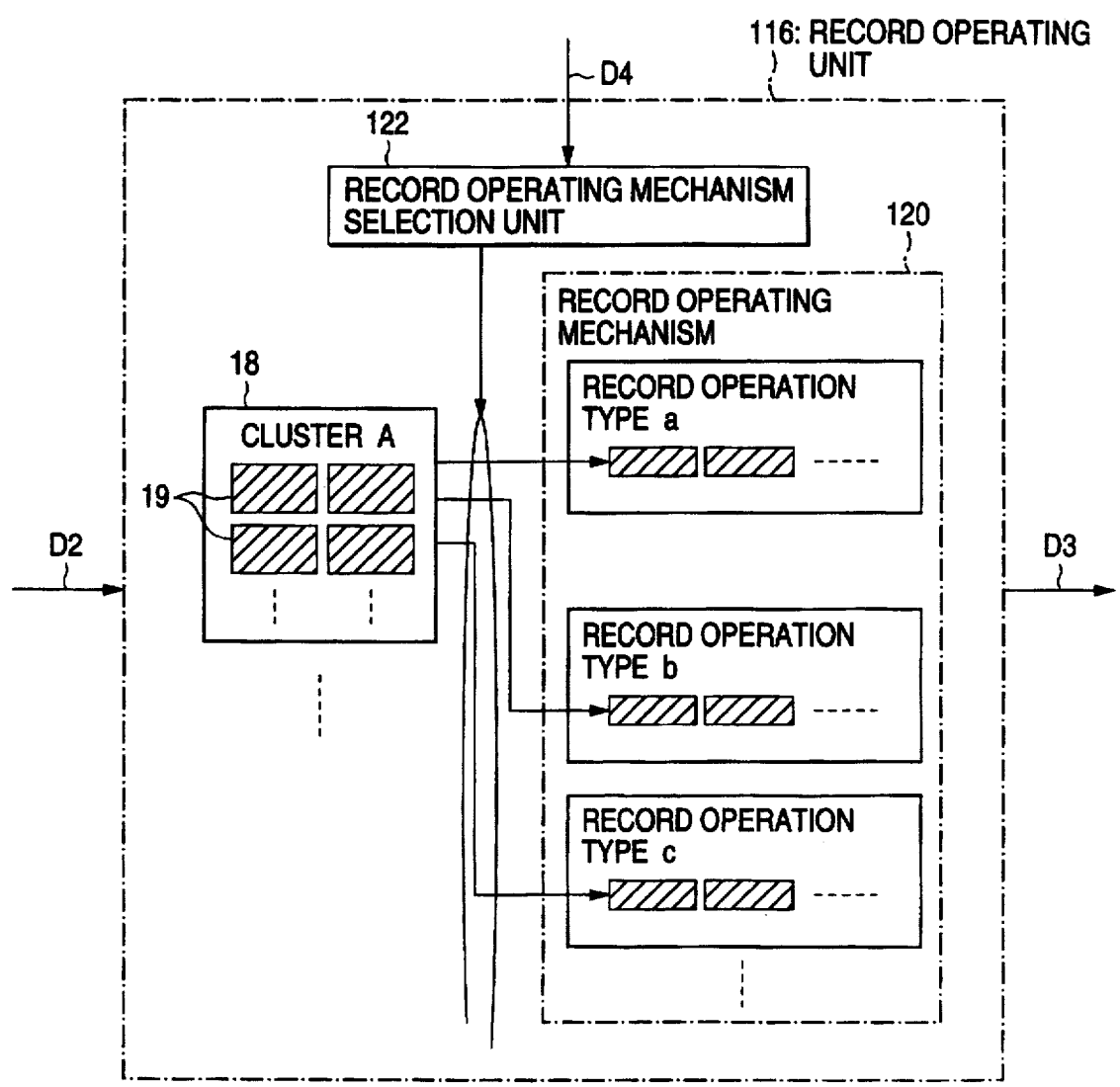
FIG. 8 is a block diagram showing a second embodiment of the record operating unit.
Figure 9:
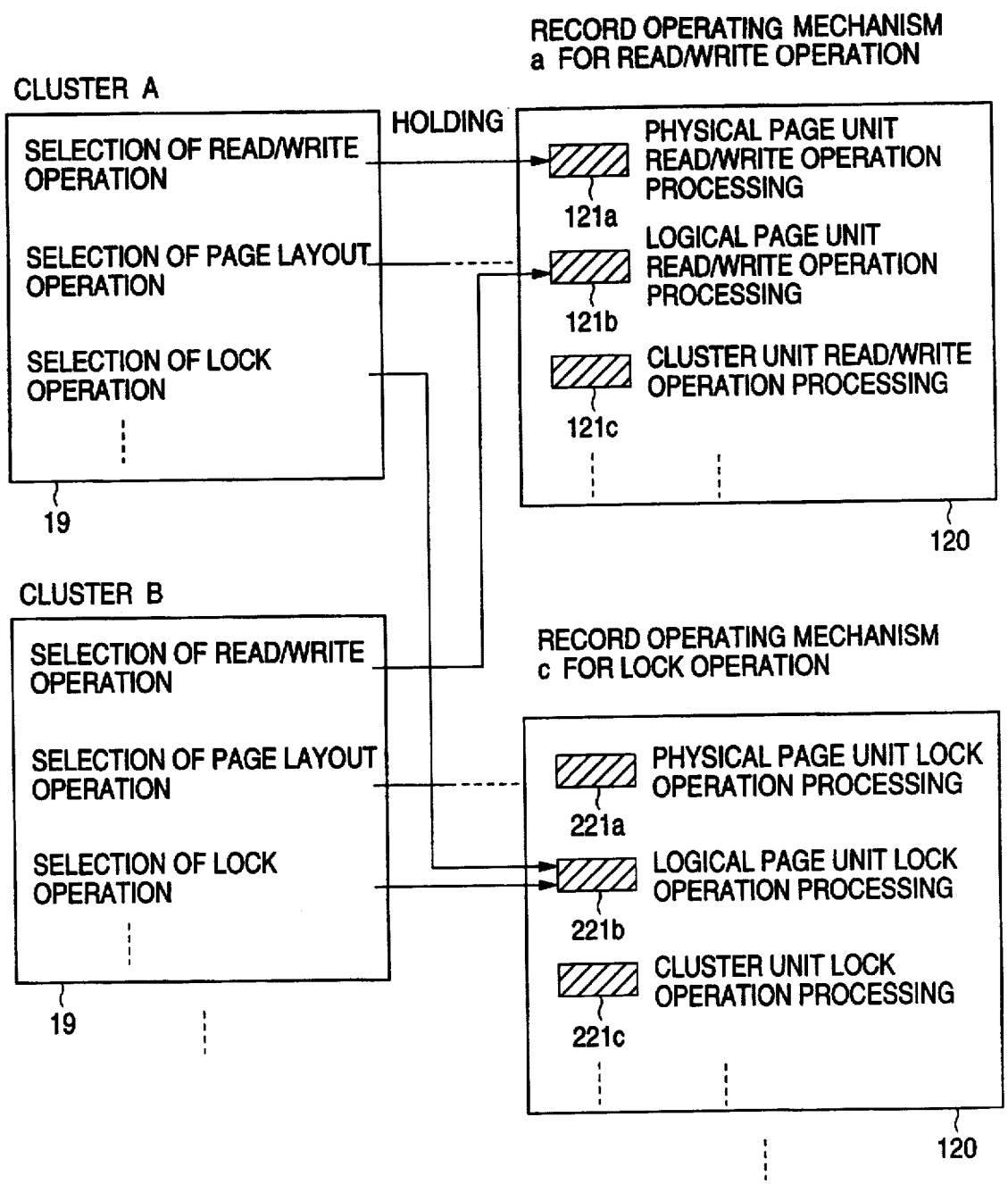
FIG. 9 schematically illustrates an example in which a cluster holds a record operating mechanism in accordance with the type of a record operation in the second embodiment.

FIG. 8 is a block diagram showing the second embodiment of the record operating unit, and it corresponds to FIG. 2. FIG. 9 is a schematic diagram showing the holding relationship between the clusters and the record operating mechanisms, and it corresponds to FIG. 3. The record operating unit having a new internal construction of this embodiment is represented by reference numeral 116. In this embodiment, the substantially same elements as the first embodiment are represented by the same reference numerals, and the description thereof is omitted.

As shown in FIG. 8, the record operating unit 116 includes plural clusters (A, B, etc.) 18, a record operating mechanism 120 which is a collection of plural record operating mechanisms which are allocated to various types of operations on records respectively, a record operating mechanism selecting unit 122. In FIG. 8, only a cluster A in plural clusters is shown. Each of the plural clusters 18 manages plural records 19 which are related to one another.

Next, the record operating mechanism 120 will be described in detail with reference to FIGS. 8 and 9. The record operating mechanism 120 of this embodiment is provided with plural record operating mechanism which are individually formed in correspondence to the types of operations on records (a, b, c, . . . ) in the record operating mechanism 120. In the following description, these record operating mechanisms are referred to as the record operating mechanisms a, b, c, . . . so as to meet the types of the record operations a, b, c, . . . As the type of the record operation may be listed a read/write operation a, a page layout operation b, a lock operation c a client server operation d, a cache operation e, a history operation f, etc. FIG. 9 shows the record operating mechanism a for the read/write operation and the record operating mechanism c for the lock operation. Other record operating mechanisms are provided for the other types of operations on records.

Each of the plural record operating mechanisms which are respectively provided in accordance with the various operations (types) on records is further provided with plural record operating processing units in accordance with the operation content. For example, as shown in FIG. 9, the record operating mechanism a is provided with three record operating processing units on the read/write operation on the auxiliary storage device 14, that is, a physical page unit read/write operation processing unit 121a, a logical page unit read/write operation processing unit 121b, and a cluster unit read/write operation processing unit 121c. The record operating mechanism c is also provided with three record operating processing units on the lock operation on the auxiliary storage device 14, that is, a physical page unit lock operation processing unit 221a, a logical page unit lock operation processing unit 221b, and a cluster page unit lock operation processing unit 221c.

In the record operating unit 116 according to this embodiment, the holding relationship between the cluster 18 and the record operating mechanism is established so that each cluster individually selects and holds one of plural record operating processing units contained in each of the plural record operating mechanisms which are respectively provided in accordance with the record operation types. That is, each of the clusters A and B individually performs selection of a read/write operation processing unit, selection of a page layout operation processing unit, selection of a lock operation processing unit, etc. to thereby establish an individual holding relationship between each cluster and each record operating mechanism (a, b, c, ...) as shown in FIG. 9.

An example of the holding relationship in this embodiment will be described with reference to FIG. 9.

With respect to the cluster A, the physical page unit read/write operation processing unit 121a is selected and held by the cluster A in the record operating mechanism a, and the logical page unit lock operation processing unit 221b is selected and held by the cluster A in the record operating mechanism c. With respect to the cluster B, the logical page unit read/write operation processing unit 121b is selected and held by the cluster B in the record operating mechanism a, and the logical page unit lock operation processing unit 221b is selected and held by the cluster B in the record operating mechanism c. As described above, each cluster individually holds a record operating processing unit in each record operating mechanism. The holding relationship between each cluster and one of the record operating processing units in each record operating mechanism (a, b, c, ...) is established by the record operating mechanism selecting unit 122. Furthermore, likewise the first embodiment, the holding relationship between each cluster and one of the record operating processing units in each record operating mechanism (a, b, c, ...) can be individually and selectively switched in accordance with the using atmosphere by the record operating mechanism selecting unit 122.

Next, a processing flow of the record operating mechanism selecting command D4 in the record operating mechanism selection unit 22 in this embodiment will be described with FIG. 10. In this case, the record operating mechanism selecting command D4 is given as a selection command "sel" having a structure: sel (cluster, operation, selection, registry).

According the command "sel," a cluster to be controlled is specified with an argument "cluster," the type of an operation on records (a, b, c, d, e, f, etc.) is specified with an argument "operation," possible processing for the record operation in accordance with the type of the record operation is specified with an argument "selection," and "transient" or "persistent" is specified with an argument "registry." The arguments "cluster" and "registry" are identical to those described with reference to FIG. 7, and the means of "transient" or "persistent" is identical to that described with reference to FIG. 7.

As described above, the record operating mechanisms are formed in accordance with the type of the record operation as shown in FIG. 8, and thus the argument "operation" is introduced to specify the type of the record operation (the record operating mechanism a, b, c, ...). The argument "selection" is introduced to specify a proper record operating processing unit in accordance with each specified operation type.

In FIG. 10, when the record operating mechanism selecting command D4, that is, the command "sel" is input to the record operating mechanism selection unit 122, the processing for an operation corresponding to the argument "selection" is obtained in a record operating mechanism which is specified with the argument "operation" (step 31). Subsequently, a cluster which is specified with the argument "cluster" is related to an operation processing, that is, a record operating processing unit (specified with the argument "operation") in each record operating mechanism (specified with the argument "selection") (step S32). That is, the specified cluster holds one of the record operating processing units in each record operating mechanism (a, b, c, ...) in accordance with the record operation type. At next judgment step S33, it is judged whether the value of the argument "registry" indicates "transient" or "persistent." If the value of the argument "registry" indicates "transient," the processing is finished. On the other hand, if the value of the argument "registry" indicates "persistent," step S34 is executed to register selection information on the record operating mechanism in an area of the auxiliary storage device 14 for the cluster which is specified with the argument "cluster."

In the second embodiment of the record operating unit, plural record operating mechanism which are respectively formed in accordance with the record operation type are provided to plural clusters 18, and a record operating processing unit which is suitable for the environment where each cluster is used is specified between each cluster and each of all the record operating mechanisms by the record operating mechanism selecting unit 122 to thereby establish the holding relationship between each cluster and each record operating processing unit. With this construction, the optimum processing to the records in each cluster can be performed.

According to the second embodiment, the holding relationship between each cluster 18 and the plural record operating mechanisms which are provided in accordance with the operation type is dynamically switched to a desirable one by the record operating mechanism selecting unit 122 so that the optimum processing can be performed, every recording operating processing unit as a unit in each record operating mechanism in accordance with alteration of an environment of use such as variation of the access frequency to the records, variation of the number of records or the like. Through this switching operation, the higher access efficiency can be kept. Particularly, according to the second embodiment, the holding relationship between the cluster and the record operating mechanism may be switched by merely altering only a part of the holding relationship which is required to be altered when the environment of use is varied.

As described above, according to the data management device for managing data stored in a storage device in the present invention, the plural record processing means for executing various operations on records are separately provided for clusters for managing plural related records, the holding relationship between the cluster and the record processing means is selected by the selection means, and the holding of the record processing means by the cluster is freely alterable in accordance with the environment where the cluster is used. Therefore, a record processing means which is suitable to execute the operation on records can be selected in accordance with an individual environment where the cluster is used, and thus the record storage efficiency and the access efficiency can be improved in accordance with the environment of use without reorganizing the database.

What is claimed is:

1. A data management device for managing records, each of which is untyped byte data, stored in a storage device, comprising:
    a plurality of clusters for managing records, the records having been subjected to a clustering control;
    a plurality of record processing means for executing operations on the records;
    each of the plurality of clusters have a holding relationship with one of the plurality of record processing means;
    selection means for switching the holding relationship from one of the plurality of record processing means to another;
    each of the plurality of clusters receiving a record operating command for operating on a record included in the cluster and directly transmitting the record operating command to one of the plurality of record processing means which is determined in advance in accordance with the holding relationship; and
    the one of the plurality of record processing means which receives the record operating command, executing an operation on the record in response to the record operating command.

2. The data management device of claim 1, wherein the selection means switches the holding relationship based on a selection command in accordance with an environment where a particular cluster is used, the environment including a frequency of access to records belonging to the particular cluster and a number of records belonging to the particular cluster.

3. The data management device of claim 1, wherein the selection means switches the holding relationship means dynamically in accordance with an environment where a particular cluster is used, thereby providing a high data record access efficiency.

4. The data management device of claim 1, wherein each of the plurality of record processing means includes a plurality of record operation processing units for different types of operations; and
    wherein the one of the plurality of record processing means which receives the record operating command, executes an operation of one of the plurality of record operation processing units.

5. A data management device for managing records, each of which is untyped byte data, stored in a storage device, comprising:
    a plurality of clusters for managing records, the records having been subjected to a clustering control;
    a plurality of record processing means for executing operations on the records, wherein the record processing means includes a plurality of record operation processing units of the same type;
    each of the plurality of clusters having a plurality of holding relationships, each holding relationship being with one of the plurality of record operation processing units in the plurality of record processing means;
    selection means for switching the holding relationship from one of the plurality of record operation processing units to another;
    each of the plurality of clusters receiving a record operating command for operating on a record included in the cluster and directly transmitting the record operating command to one of the plurality of record operation processing units which is determined in advance in accordance with the holding relationship; and
    the one of the plurality of record processing means which receives the record operating command, executing an operation on the record in response to the record operating command.

6. The data management device of claim 1, wherein
    the cluster has the holding relationship by securing a storage area for setting a pointer in the cluster, and setting a pointer to one of the plurality of record processing means, and
    the selection means switches the pointer set in a particular storage area from one of the plurality of record processing means to another.

7. The data management device of claim 5, wherein
    the cluster has holding relationships by securing storage areas, each for setting a pointer in the cluster and setting a pointer to one of the plurality of record operation processing units, and
    the selection means switches the pointer set in a particular storage area from one of the plurality of record operation processing units to another.

8. The data management device of claim 1, further comprising:
    a data model means for establishing an object model whose abstraction level is higher than that of the records, and which handles objects; and
    the data model means receiving a command for operating one of the objects and converting the received command to the record operating command to be supplied to one of the plurality of clusters.

* * * * *